US009481194B2

(12) United States Patent
Hasegawa

(10) Patent No.: US 9,481,194 B2
(45) Date of Patent: Nov. 1, 2016

(54) PAGE-TURNING DEVICE AND DOCUMENT CAMERA SYSTEM

(71) Applicant: CASIO COMPUTER CO., LTD., Shibuya-ku, Tokyo (JP)

(72) Inventor: Hirokazu Hasegawa, Koganei (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 221 days.

(21) Appl. No.: 14/305,373

(22) Filed: Jun. 16, 2014

(65) Prior Publication Data

US 2014/0366412 A1 Dec. 18, 2014

(30) Foreign Application Priority Data

Jun. 18, 2013 (JP) ................................. 2013-127095

(51) Int. Cl.
*H04N 1/04* (2006.01)
*B42D 9/04* (2006.01)
*B42D 9/06* (2006.01)

(52) U.S. Cl.
CPC .. *B42D 9/04* (2013.01); *B42D 9/06* (2013.01)

(58) Field of Classification Search
CPC ............ B42D 9/04; B42D 9/06; H04N 1/04; H04N 5/232; H04N 1/193; H04N 1/1012; H04N 1/12
See application file for complete search history.

(56) References Cited

U.S. PATENT DOCUMENTS 6,049,033 A * 4/2000 Dallas ...................... B42D 9/06 40/531
7,259,312 B2 * 8/2007 Jakes ....................... B42D 9/04 40/476
2003/0063334 A1 * 4/2003 Mandel .............. H04N 1/00607 358/498
2003/0063335 A1 * 4/2003 Mandel .............. H04N 1/00607 358/498
2005/0230592 A1 * 10/2005 Tillinghast ............... B42D 9/06 248/441.1
2008/0316551 A1 * 12/2008 Taylor ...................... H04N 1/04 358/498
2010/0296138 A1 11/2010 Jakes et al.
2014/0078561 A1 3/2014 Hasegawa
2014/0168726 A1 6/2014 Hasegawa

FOREIGN PATENT DOCUMENTS

CN 102963151 A 3/2013
JP 05201174 A 8/1993

OTHER PUBLICATIONS

Chinese Office Action (and English translation thereof) dated Jul. 23, 2015, issued in counterpart Chinese Application No. 201410269711.9.

* cited by examiner

*Primary Examiner* — Cheukfan Lee
(74) *Attorney, Agent, or Firm* — Holtz, Holtz & Volek PC

(57) ABSTRACT

A page-turning device turning a page of a book includes a sticking part, an arm part and a first drive unit. The sticking part sticks to the page of the book being opened. The arm part is provided with the sticking part on a top end and swings such that the sticking part sticks to the page at a departure position of the page and separates from the page at a destination position of the page while the sticking part goes to and fro between the departure position and the destination position over the page of the book. The first drive unit swings the arm part around a drive shaft of the drive unit. An effective surface of the sticking part obliquely comes into contact with the page at the departure position at an initial stage of the contact.

9 Claims, 12 Drawing Sheets

PAGE-TURNING DEVICE AND DOCUMENT CAMERA SYSTEM

CROSS REFERENCE TO RELATED APPLICATION

This application is based upon and claims the benefit of priority under 35 USC 119 of Japanese Patent Application No. 2013-127095 filed on Jun. 18, 2013, the entire disclosure of which, including the descriptions, claims, drawings and abstracts, is incorporated herein by reference in its entirety.

BACKGROUND OF THE INVENTION

1. Field of the Invention

The present invention relates to a page-turning device and a document camera system.

2. Description of Related Art

A known automatic page-turning device sticks to one of the stacked pages of a book, for example, to turn over the pages one by one (see Japanese Patent Application Laid-Open Publication No. H5-201174, for example). In specific, a vertically movable adhesive member is moved to adhere onto the uppermost page with a supporting lever of the adhesive member, and is then upwardly moved to separate the uppermost page from the remaining pages.

SUMMARY OF THE INVENTION

Unfortunately, the page-turning device, which upwardly and downwardly moves the adhesive member such that the adhesive member adheres to the page to turn over the page, may have a risk of failure in holding (adhesion) of (to) the page.

An object of the present invention is to provide a page-turning device having improved performance in holding (adhesion) of (to) a page to be turned, and enhanced reliability of the page-turning.

In order to achieve at least one of the objects, according to a first aspect of the present invention, there is provided a page-turning device turning a page of a book including a sticking part which sticks to the page of the book being opened, an arm part with the sticking part provided on a top end, the arm part swinging such that the sticking part sticks to the page at a departure position of the page and separates from the page at a destination position of the page while the sticking part goes to and fro between the departure position and the destination position over the page of the book, and a first drive unit which swings the arm part around a drive shaft of the first drive unit, wherein an effective surface of the sticking part obliquely comes into contact with the page at the departure position at an initial stage of the contact.

In order to achieve at least one of the objects, according to a second aspect of the present invention, there is provided a document camera system including the page-turning device and an imaging unit which images pages of the book.

BRIEF DESCRIPTION OF THE DRAWINGS

The present invention will become more fully understood from the detailed description given hereinafter and the appended drawings, which are given by way of illustration only and thus are not intended as a definition of the limits of the present invention, wherein.

DETAILED DESCRIPTION OF THE PREFERRED EMBODIMENT

Hereinafter, an embodiment of the present invention will be described with reference to the drawings. Though various technical limitations which are preferable to carry out the present invention are added to the after-described embodiment, the scope of the invention is not limited to the following embodiment and the illustrated examples.

Figure 1:
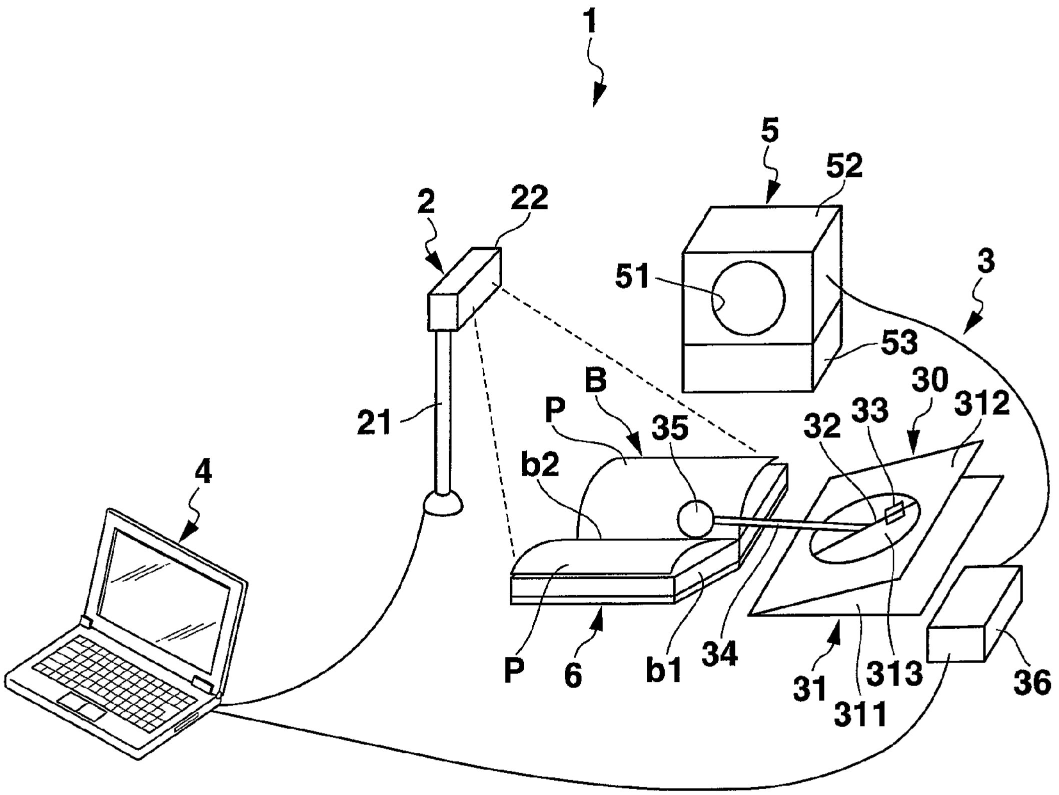
FIG. 1 is a perspective view schematically showing the configuration of a document camera system according to an embodiment of the present invention.
Figure 2A:
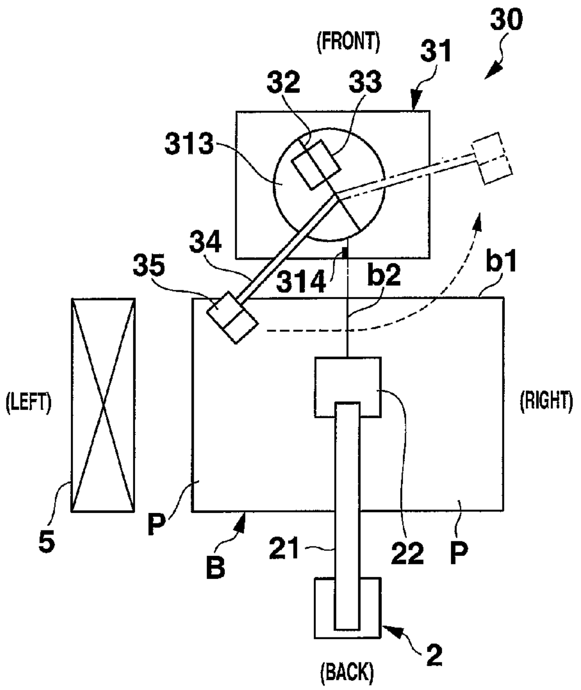
FIG. 2A is a top view showing the configuration of the essential part of the document camera system in FIG. 1.
Figure 2B:
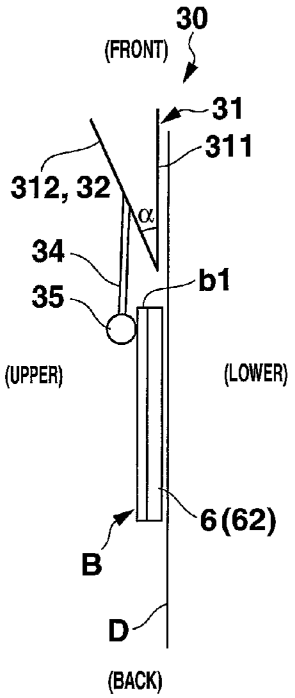
FIG. 2B is a side view showing the configuration of the essential part of the document camera system in FIG. 1.
Figure 3:
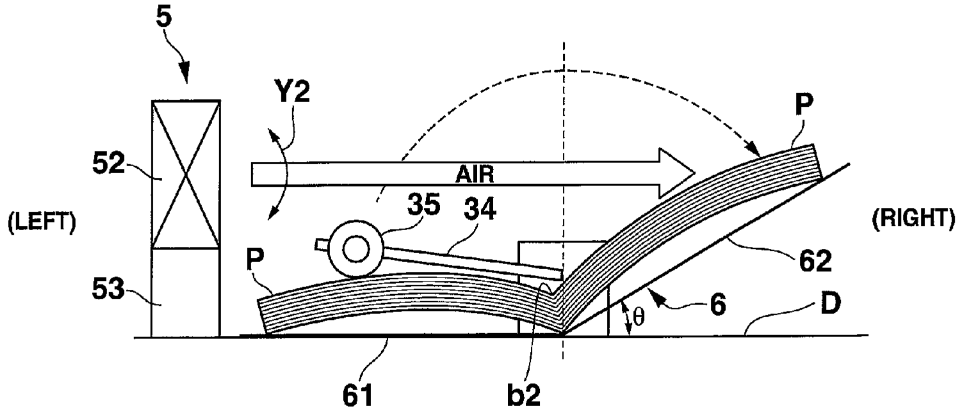
FIG. 3 is an elevation view showing a route of a sticking part provided on the top end of an arm part according to the embodiment.

FIG. 1 is a perspective view schematically showing the configuration of a document camera system according to the embodiment. FIG. 2A and FIG. 2B illustrate the configuration of the essential part of the document camera system, wherein FIG. 2A is a top view, and FIG. 2B is a side view. FIG. 3 is an elevation view showing the essential part of the document camera system. In the explanation hereinafter, pages P of a book B are turned from left to right.

As shown in FIG. 1 to FIG. 3, a document camera system 1 includes: a document camera 2 as an image pickup unit which picks up images of pages P of the book B; a page-turning device 3 which turns pages P of the book B; and a personal computer 4 connected to the document camera 2 and the page-turning device 3 such that the computer 4 can communicate with the document camera 2 and the page-turning device 3.

The document camera 2 includes a stand part 21 and a camera 22 attached to the upper end of the stand part 21. The stand part 21 is inclinable in the front-back direction and the left-right direction, and extensible in the up-down direction, so that a positional relationship of the book B and the camera 22 can be adjusted. A lens of the camera 22 faces downward such that the book B comes within an angle of view. A position-adjustment mechanism is disposed at the joining portion of the camera 22 and the stand part 21, so that the facing direction of the lens of the camera 22 can be adjusted.

The page-turning device 3 includes: a support base 6 which supports the book B being opened; a turning unit 30 which holds a page P at a departure position of pages P of the book B and which releases the holding of the page P at a destination position of pages P; a blower 5 which sends air above a page P at the departure position to blow against a page P at the destination position; and a control unit 36 which controls these parts and the like.

As shown in FIG. 3, the support base 6 includes a couple of support plates 61, 62. The support base 6 can be folded up by using a hinge, which is not shown in drawings. When pages P of the book B are turned from left to right as shown in FIG. 3, a first support plate 61 of the support plates 61, 62 which is disposed on the left is laid on the desk D, and a second support plate 62 which is disposed on the right is placed on the desk D such that the second support plate 62 is inclined at a predetermined angle as if the second support plate 62 approaches the first support plate 61. Pages P at the departure position is placed on the first support plate 61, while pages P at the destination position is placed on the second support plate 62.

When pages P of the book B are turned from right to left, the second support plate 62 which is disposed on the right is laid on the desk D, and the first support plate 61 which is disposed on the left is placed on the desk D such that the first support plate 61 is inclined at a predetermined angle as if the first support plate 61 approaches the second support plate 62. Pages P at the departure position is placed on the second support plate 62, while pages P at the destination position is placed on the first support plate 61.

Thereby, the support base 6 supports the book B such that a destination position inclined angle between the pages P at the destination position and an horizontal plane is larger than a departure position inclined angle between the pages P at the departure position and the horizontal plane. Since the support base 6 can be folded up by using a hinge between the support plates 61, 62, an angle between the support plates 61, 62 is adjustable. Therefore the destination position inclined angle θ between the pages P at the destination position and the horizontal plane is adjustable. The destination position inclined angle θ is preferably adjusted to 30 to 45 degrees.

The turning unit 30 includes: a base 31; a first drive unit (drive unit) 33, such as a motor, disposed on the base 31 and having a drive shaft 32; an arm part 34 which swings around the drive shaft 32; and a sticking part 35 attached to the top end of the arm part 34, the sticking part 35 sticking to a page P of the book B.

The base 31 is disposed on a desk D such that one side of the base 31 is parallel to the upper side b1 of the book B opened on the support base 6. In the explanation hereinafter, "back" is defined as a side where the book B is disposed, i.e. the book B side, and "front" is defined as a side where the base 31 is disposed, i.e. the base 31 side. The seam b2 of the book B is along the front-back direction. The base 31 includes a main base 311 and a sub base 312 which is superposed on the main base 311 and can adjust an angle α between the main base 311 and the sub base 312. On the back end (the end on the book B side) of the sub base 312, a hinge (not shown) is disposed. This hinge makes the angle α between the sub base 312 and the main base 311 adjustable. The sub base 312 is provided with a rotating plate 313 which is rotatable and supports the first drive unit 33. The drive shaft 32 of the first drive unit 33 is disposed parallel to the upper surface of the rotating plate 313.

When pages P of the book B are turned from left to right, the angle of the rotating plate 313 is determined such that the back end (the end on the book B side) of the drive shaft 32 turns to right-hand side with respect to the seam b2 of pages P and the front end (the end on a side opposite to the book B side) of the drive shaft 32 as the base end turns to left-hand side with respect to the seam b2 of pages P. On the other hand, when pages P of the book B are turned from right to left, the angle of the rotating plate 313 is determined such that the back end (the end on the book B side) of the drive shaft 32 turns to left-hand side with respect to the seam b2 of pages P and the front end (the end on the side opposite to the book B side) of the drive shaft 32 turns to right-hand side with respect to the seam b2 of pages P.

Whichever the turning direction is, the drive shaft 32 is inclined such that the base end of the drive shaft 32 is on a side where a departure position of pages P exists (departure position side) with respect to the seam b2 of the book B and also inclined at the angle α with respect to a plane on which the book B is put (horizontal plane).

Also, a mark 314 for locating is formed at the back end (the end on the book B side) of the sub base 312. It is preferable to locate the base 31 such that this mark 314 is on the extension of the seam b2.

The arm part 34 is inclined with respect to the drive shaft 32 toward the book B side. As the drive shaft 32 rotates, the arm part 34 goes to and fro (shuttle operation) between the departure position and a destination position of pages P as if the arm part 34 draws a circular arc around the drive shaft 32. That is to say, the drive shaft 32 is a symmetry axis of swing of the arm part 34. In the explanation hereinafter, a movement from the departure position to the destination position of pages P is referred to as an outward movement (a motion of going), and a movement from the destination position to the departure position is referred to as a homeward movement (a motion of return).

FIG. 3 is an elevation view (viewed in a direction along an axis of the seam b2 of pages P or viewed from a plane side, the normal line of which is parallel to the seam b2) showing a route of the sticking part 35 provided on the top end of the arm part 34. As shown in FIG. 3, in the outward movement, the sticking part 35 on the top end of the arm part 34 moves from a position which contacts the departure position of pages P to the destination position of pages P as if the sticking part 35 draws a circular arc over pages P.

Figure 4A:
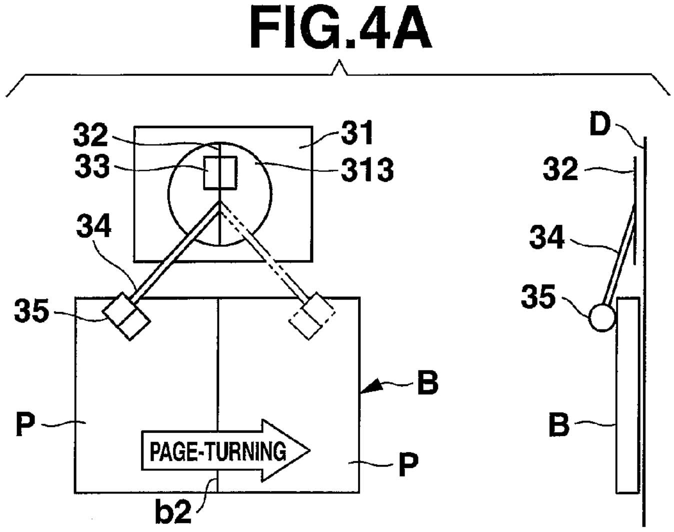
FIG. 4A, FIG. 4B and FIG. 4C schematically illustrate how inclination of a drive shaft of a first drive unit according to the embodiment affects a page-turning operation.
Figure 4B:
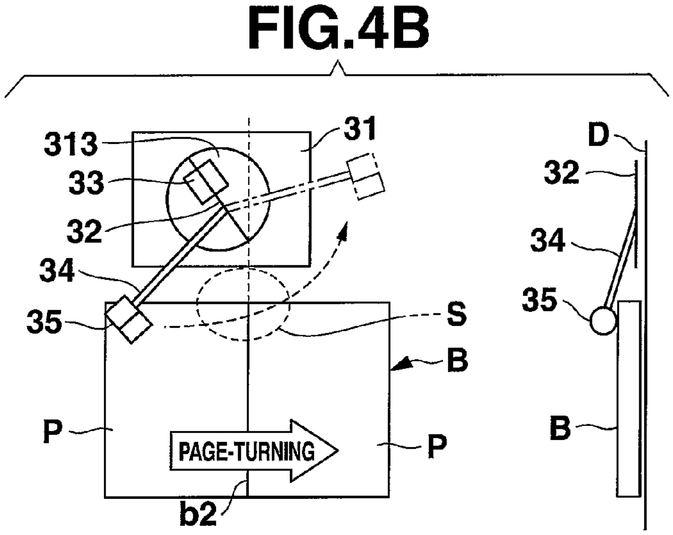
Figure 4C:
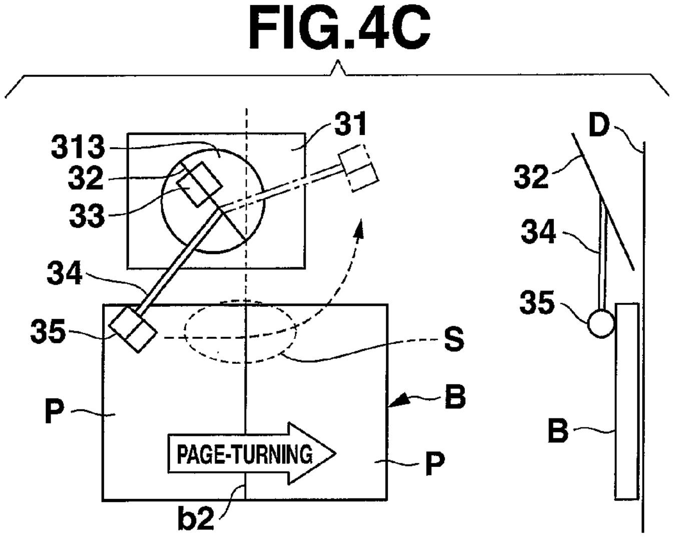

FIG. 4A, FIG. 4B and FIG. 4C schematically illustrate how the inclination of the drive shaft 32 affects the page-turning operation of pages P. FIG. 4A, FIG. 4B and FIG. 4C show the book B placed not on the support base 6 but directly on the desk D so that the configuration can be easily understood. FIG. 4A illustrates a case where the drive shaft 32 is horizontally disposed on the extension of the seam b2. In this case, since the sticking part 35 moves along a route the symmetry axis of which corresponds to the seam b2, the sticking part 35 keeps in contact with the right-side page P at the destination position of pages P without being able to separate from the page P.

FIG. 4B illustrates a case where the drive shaft 32 is horizontal and inclined such that the back end of the drive shaft 32 turns to right-hand side with respect to the seam b2 of pages P and the front end of the drive shaft 32 as the base end turns to left-hand side with respect to the seam b2 of pages P. In this case, after the sticking part 35 sticks to a page P at the departure position, the arm part 34 rotates around the drive shaft 32, and at the end point of the outward movement, the sticking part 35 separates from the book B forward. Therefore, the sticking part 35 can easily separate from the sticking page P.

In this case, however, pages P cannot always be turned smoothly. One possible cause is that the distance between the book B and the sticking part 35 becomes long in the first phase to the middle phase (the ellipse S) of the page-turning operation.

FIG. 4C illustrates a case where the drive shaft 32 is inclined with respect to the seam b2 of the book B and is also inclined with respect to the horizontal plane, i.e. a case of the drive shaft 32 according to the embodiment. In this case, the distance between the book B and the sticking part 35 in the first phase to the middle phase (the ellipse S) of the page-turning is shorter than that in the case shown in FIG. 4B.

Figure 5A:
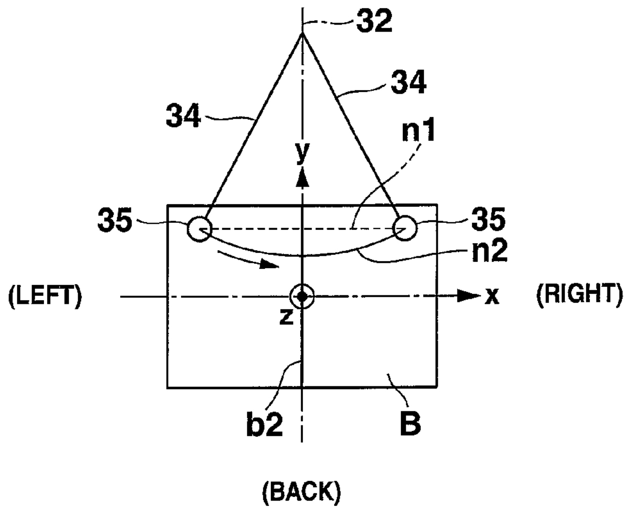
FIG. 5A, FIG. 5B and FIG. 5C are respectively a top view, a side view and an elevation view, schematically showing difference of routes of the sticking part between a case where the drive shaft of the first drive unit is horizontal and a case where the drive shaft is inclined with respect to the vertical line standing perpendicular to the seam.
Figure 5B:
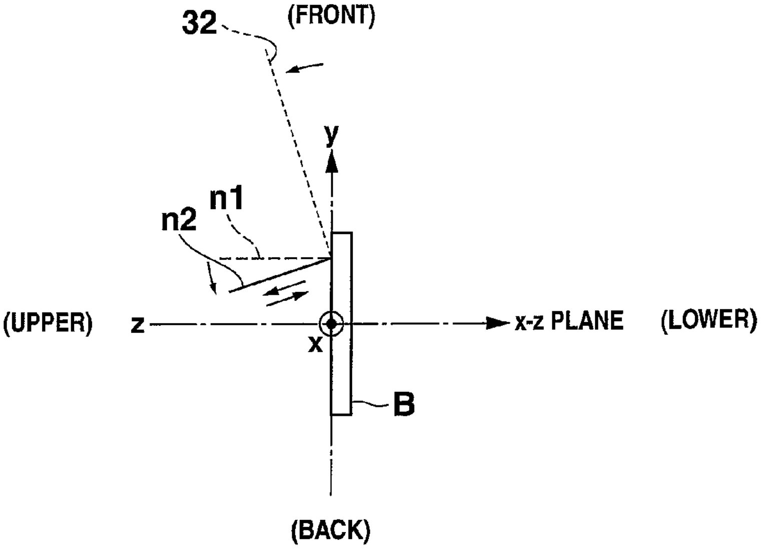
Figure 5C:
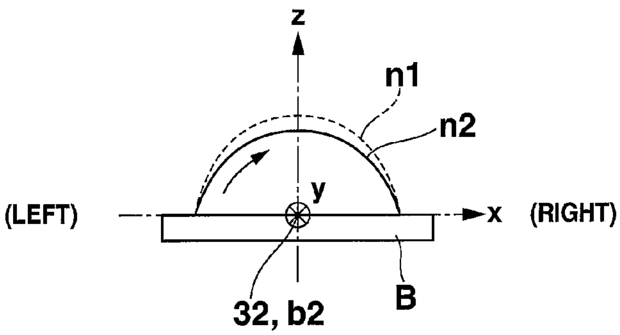

To be more specific, FIG. 5A, FIG. 5B and FIG. 5C schematically illustrate difference of routes of the sticking part 35 between a case where the drive shaft 32 is horizontal and a case where the drive shaft 32 is inclined with respect to the horizontal plane, wherein FIG. 5A is a top view, FIG. 5B is a side view, and FIG. 5C is an elevation view. In FIG. 5A, FIG. 5B and FIG. 5C, the left-right direction, the up-down direction and the vertical direction of the book B are respectively defined as an x direction, a y direction and a z direction. In FIG. 5A, FIG. 5B and FIG. 5C, the drive shaft 32 aligns with the seam b2 of the book B in order to clarify the point that the drive shaft 32 of the embodiment is inclined with respect to the horizontal plane. As shown in FIG. 5A, FIG. 5B and FIG. 5C, in the case where the drive shaft 32 is horizontal (dot lines in the figures), the locus n1 of the sticking part 35 is a straight line along the left-right direction in the top view (FIG. 5A), a straight line along the vertical direction in the side view (FIG. 5B) and a semicircle in the elevation view (FIG. 5C). On the other hand, in the case where the drive shaft 32 is inclined with respect to the horizontal plane (solid lines in the figures), the locus n2 of the sticking part 35 is a circular arc being convex backward in the top view (FIG. 5A), a straight line with its upper end being inclined backward in the side view (FIG. 5B) and a deformed semicircle in the elevation view (FIG. 5C). The locus n2 in FIG. 5B shows the locus plane of the driven sticking part 35 viewed from the side. It shows that the locus n2 is inclined with respect to a plane (x-z plane) including the left-right direction of the book B and a normal line of the book B.

As is known from FIG. 5C, the distance from the sticking part 35 to the seam b2 when the sticking part 35 passes over the seam b2 is shorter than the distance from the sticking part 35 to the seam b2 when the sticking part 35 sticks to a page P at the departure position. That is to say, the locus n2 can make the distance from the book B to the sticking part 35 when the sticking part 35 passes over the seam b2 shorter than the locus n1.

Thus, according to the embodiment shown in FIG. 4C, in the second phase of the page-turning, the distance between the book B (the seam b2) and the sticking part 35 becomes long, so that the sticking part 35 can easily separate from the sticking page P. Also, in the first phase to the middle phase (the ellipse S) of the page-turning operation, the distance between the book B (the seam b2) and the sticking part 35 becomes short, so that a page P can be slackened appropriately. Therefore, pages P can be reliably turned.

In the homeward movement, the moving direction is opposite to that in the outward movement, and the sticking part 35 takes the same route as that of the outward movement, moves keeping a distance from pages P and, in the end, sticks to another page P at the departure position of pages P. Repeating this shuttle operation progresses the page-turning operation of pages P.

In the present embodiment, the drive shaft 32 is inclined with respect to the seam b2 of the opened book B and is also inclined with respect to the horizontal plane as shown in FIG. 4C as an example. It is needless to say that if the drive shaft 32 is inclined with respect to either the seam b2 or the horizontal plane, these cases have their respective effects.

If the drive shaft 32 is inclined only with respect to the horizontal plane, as described later, a second drive unit 37 is driven or the sticking part 35 is configured in such a way as to stay at a higher position on the right than that on the left so that the sticking part 35 can easily separate from a page P.

Figure 6:
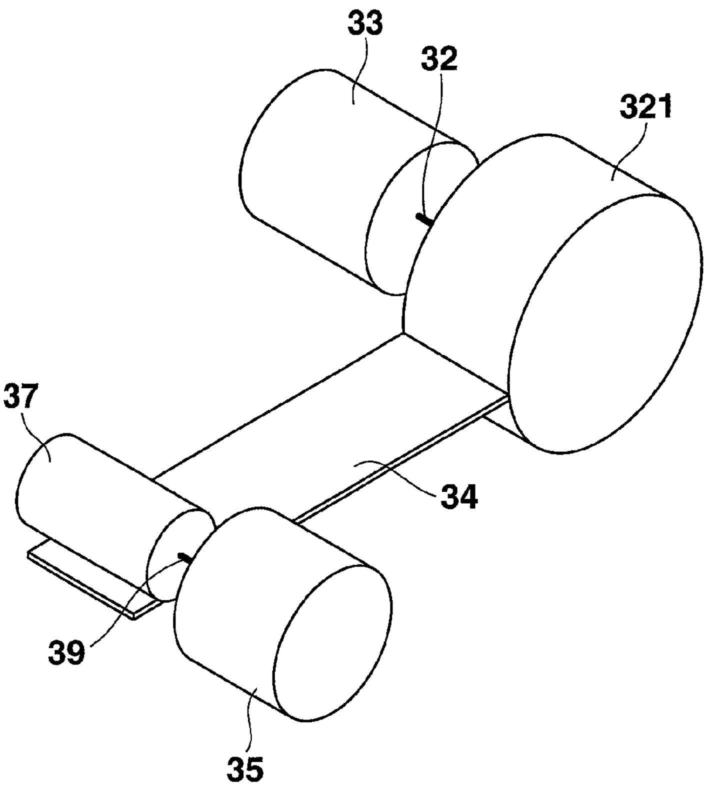
FIG. 6 is a schematic view schematically showing the configuration of the arm part according to the embodiment.

Next, specific configurations of the arm part 34 and the sticking part 35 will be explained. FIG. 6 is a perspective view schematically showing the configuration of the arm part 34.

As illustrated in FIG. 6, the drive shaft 32 has a rotator 321 attached to one end of the drive shaft 32. The rotator 321 is attached to the arm part 34 such that the arm part 34 extends along a plane orthogonal to the drive shaft 32. The arm part 34 is a rectangular plate made of resin, for example. The arm part 34 has a flat planar cross-section cut along a plane perpendicular to the longitudinal direction of the arm part 34. The sticking part 35 is attached to the top end of the arm part 34 via the second drive unit (suction rotation drive unit) 37 such as a motor.

The second drive unit 37 is disposed such that a drive shaft 39 of the second drive unit 37 is along a direction perpendicular to the longitudinal direction of the arm part 34. The sticking part 35 is removably attached to the drive shaft 39, and the sticking part 35 rotates as the drive shaft 39 rotates.

The second drive unit 37 and the sticking part 35 are covered with a cover 38.

Figure 7:
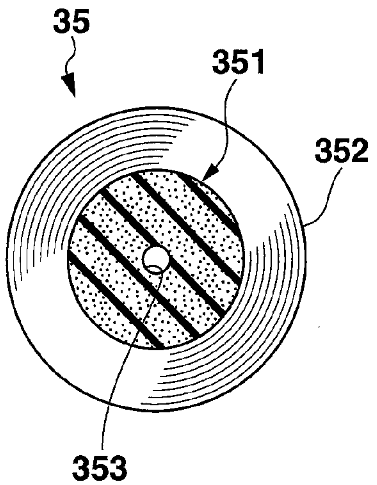
FIG. 7 is an elevation view schematically showing the configuration of the sticking part according to the embodiment.

FIG. 7 is an elevation view schematically showing the configuration of the sticking part 35.

As shown in FIG. 7, the sticking part 35 is an adhesive member having a substantially-columnar shape.

The sticking part 35 includes a columnar rotating roller 351 and an adhesive component 352 wound around the rotating roller 351.

There has been desire to improve working efficiency in replacement of the sticking parts 35 with respect to the drive shaft 39 of the second drive unit 37. Hence, the rotating roller 351 is made of an elastic body such as a sponge, and a fit hole 353 into which the drive shaft 39 is fitted is formed at the center of the rotating roller 351. Other than the sponge, examples of the elastic body include rubber and foam. The inner diameter of the fit hole 353 is formed to be smaller than the outer diameter of the drive shaft 39. By pushing the drive shaft 39 into the fit hole 353, the rotating roller 351 contracts, and the drive shaft 39 fits in the fit hole 353. Consequently, at the replacement, the rotating roller 351 can be removed from the drive shaft 39 only by pulling the rotating roller 351 to be detached from the drive shaft 39. Thus, since the rotating roller 351 is elastic, the sticking part 35 can be easily put on and removed from the drive shaft 39, and accordingly the sticking part 35 can be easily replaced with another.

Figure 8:
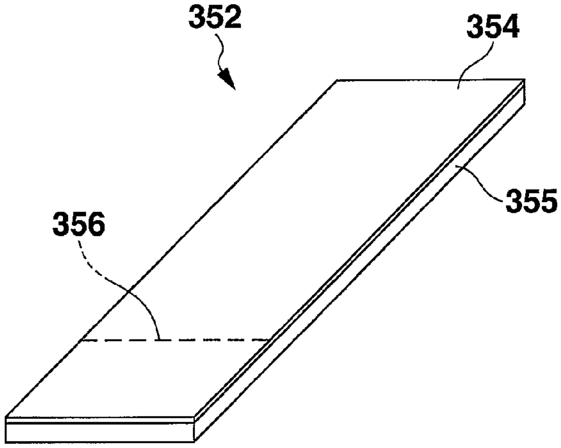
FIG. 8 is a perspective view schematically showing the structure of an adhesive component according to the embodiment.

FIG. 8 is a perspective view schematically showing the configuration of the adhesive component 352. As shown in FIG. 8, the adhesive component 352 is sheet-shaped and has, for example, a double-sided adhesive structure like a double-sided tape. The adhesive component 352 has a two-layer structure of a weak adhesive layer 354 and a strong adhesive layer 355. The weak adhesive layer 354 is provided on a side which sticks to the book B (surface side). The weak adhesive layer 354 has: weak adhesive power so that pieces of the weak adhesive layer 354 do not remain after the adhesive component 352 is removed; and a property that the weak adhesive layer 354 can be used multiple times. On the other hand, the strong adhesive layer 355 is provided on the opposite side. The strong adhesive layer 355 has adhesive power stronger than the weak adhesive layer 354 so that the strong adhesive layer 355 maintains a state of being wound around the rotating roller 351. Perforations 356 are formed at predetermined length intervals on the adhesive component 352.

Figure 9A:
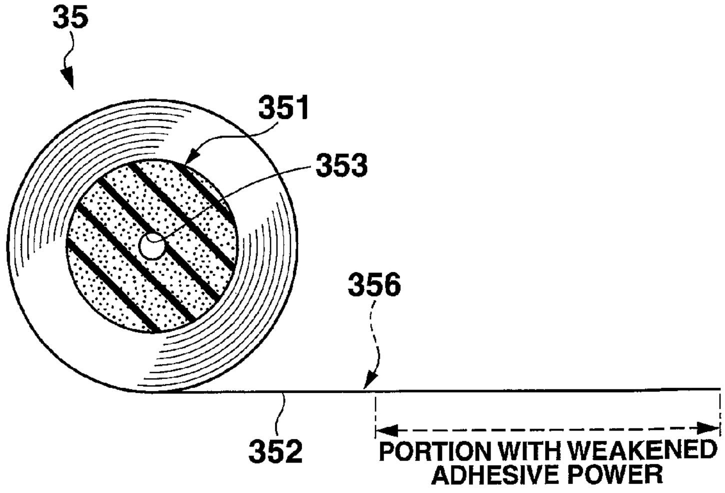
FIG. 9A and FIG. 9B illustrate a process of removing the adhesive component when the adhesive power has weakened.
Figure 9B:
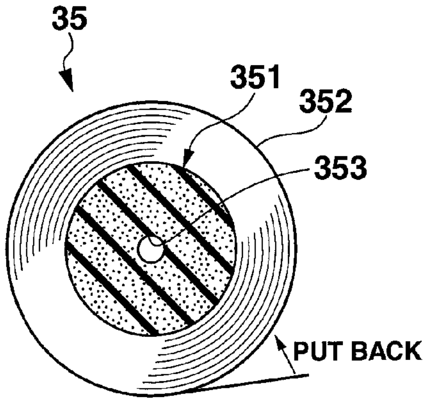

FIG. 9A and FIG. 9B illustrate a process of removing the adhesive component 352 when the adhesive power has weakened. When a user feels that the adhesive power has weakened, the user removes the most outer surface of the adhesive component 352 by one round to expose a new portion of the weak adhesive layer 354 of the adhesive component 352 as shown in FIG. 9A. Then, the portion, the adhesive power of which has weakened, can be cut along the perforation 356. At the time of cutting, if a portion thereof temporarily peels off as shown in FIG. 9B, the user puts the portion back. Thus, a new portion of the weak adhesive layer 354 is exposed, so that the page-turning operation can be appropriately resumed.

Figure 10:
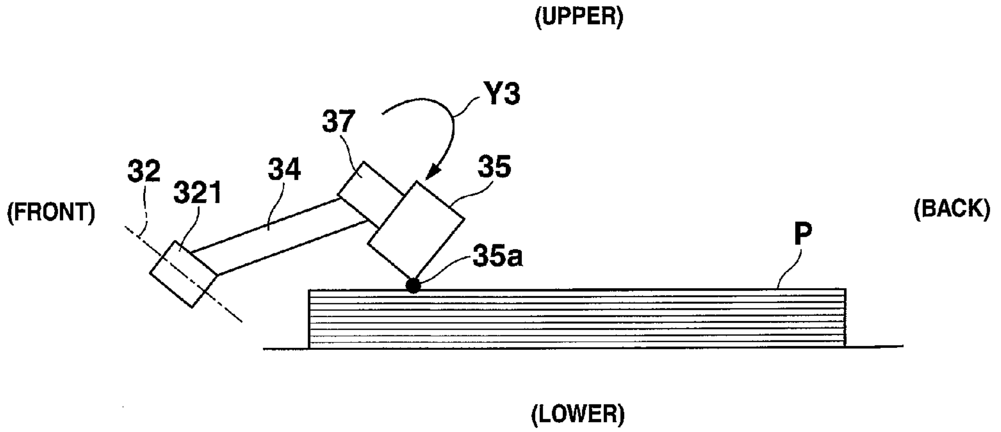
FIG. 10 is a schematic view of the sticking part according to the embodiment at an initial stage of contact with a page at a departure position.

FIG. 10 is a schematic view of the sticking part 35 at the initial stage of the contact with the page P at the departure position. As illustrated in FIG. 10, the arm part 34 moves in the direction of the arrow Y3, so that an effective (adhesive) surface of the sticking part 35 obliquely comes into contact with the page P at the departure position at the initial stage of the contact with the page P. In specific, the drive shafts 32, 39 and the arm part 34 each have a predetermined length and angle and are disposed at a predetermined position such that a part of one circumferential end portion 35*a* of the substantially-columnar sticking part 35 obliquely comes into contact with the page P. The effective surface of the sticking part 35 is the outer surface made of a generating line.

Since the effective surface of the sticking part 35 obliquely comes into contact with the page P, the area of the contact between the sticking part 35 and the page P at the initial stage of the contact is small. Thereby a high pressure can be applied on the page P. This ensures the sticking (adhesion) of the sticking part 35 to the page P.

Figure 11:
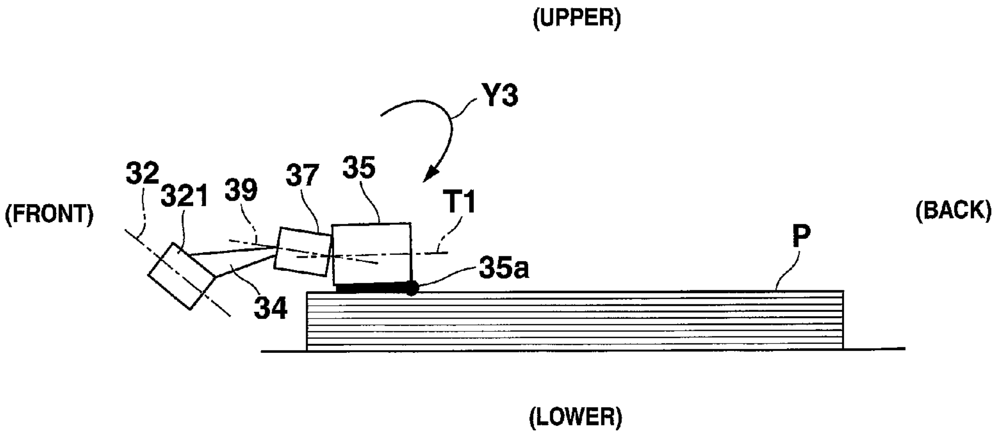
FIG. 11 is a schematic view of the sticking part according to the embodiment, the arm part of the sticking part having been moved from the position illustrated in FIG. 10.

FIG. 11 is a schematic view showing a state in which the arm part 34 has moved from the position illustrated in FIG. 10. The arm part 34 of the sticking part 35 at the initial stage of the contact with the page P at the departure position is still moved to the direction of the arrow Y3 by the first drive unit 33. Since the sticking part 35 remains in contact with the page P, the arm part 34 is twisted around its axis, which is parallel to the longitudinal direction of the arm part 34, and bows in the longitudinal direction. This causes the deformation of the rotating roller 351, and thereby the drive shaft 39 fitted into the rotating roller 351 is shifted from the central axis T1 of the rotating roller 351, so that a generating line (or a band including the generating line) of the sticking part 35 comes into close contact with the page P. The sticking part 35 is in close contact with the page P in a larger contact area than the area of the contact between the sticking part 35 and the page P at the initial stage of the contact.

Figure 12:
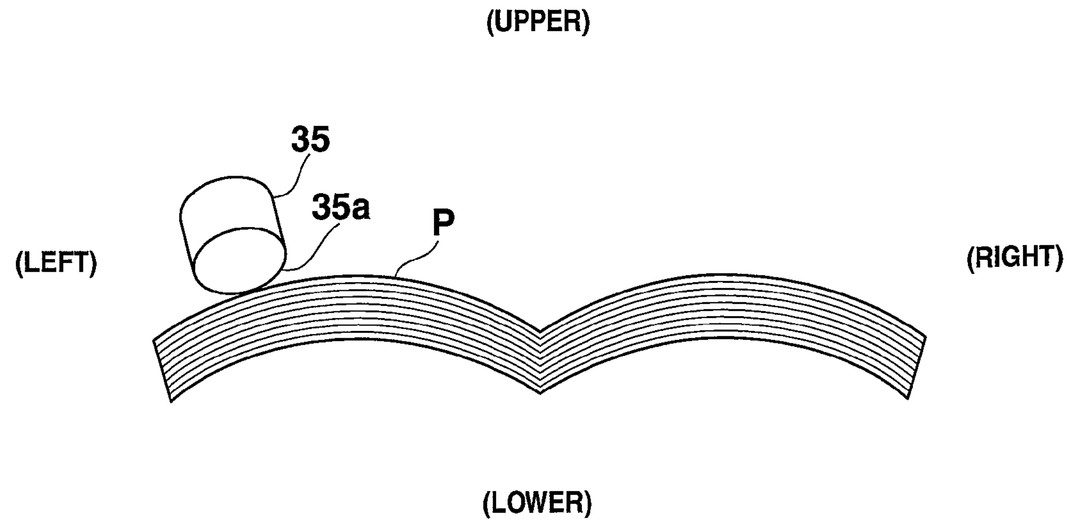
FIG. 12 is a schematic front view of the sticking part illustrated in FIG. 10.

FIG. 12 is a schematic front view of the sticking part of FIG. 10. As shown in FIG. 12, even if the page P at the departure position is warped, the effective surface of the sticking part 35 can obliquely come into contact with the page P. The area of the contact between the sticking part 35 and the page P at the initial stage of the contact is thus small. This can apply a high pressure on the page P, ensuring effective sticking of the sticking part 35 to the page P.

Such a two-step sticking operation of the sticking part 35 ensures the sticking of the sticking part 35 to the page P.

As shown in FIG. 1 to FIG. 3, the blower 5 is disposed upstream from the departure position of the book B. For example, when pages P of the book B is turned from left to right, the blower 5 is disposed on the left side of pages P which is placed at the departure position of the book B. When pages P of the book B is turned from right to left, the blower 5 is disposed on the right side of pages P which is placed at the departure position of the book B. Therefore the blower 5 is disposed outside the angle of view of the camera 22. The blower 5 includes a blower body 52 and a blower base 53 which supports the blower body 52. The blower body 52 includes an air outlet 51 which sends out air.

Figure 13:
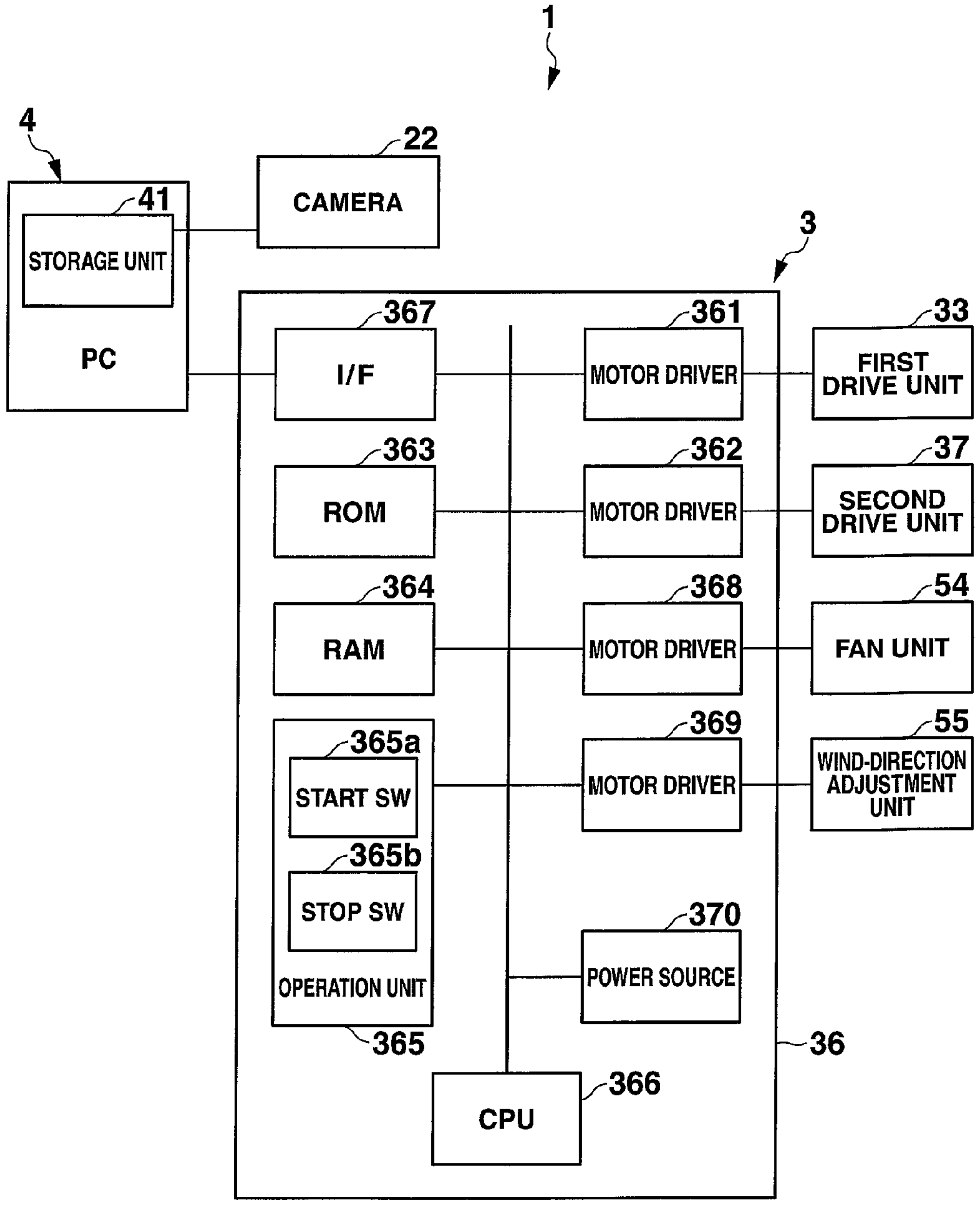
FIG. 13 is a block diagram showing the main control configuration of the document camera system according to the embodiment.

The blower body 52 is provided with a fan unit 54 (see FIG. 13) and a wind-direction control unit 55 (see FIG. 13). The fan unit 54 sends air from the air outlet 51. The wind-direction control unit 55 changes a moving direction of a wind (a wind direction) sent from the fan unit 54. The wind-direction control unit 55 changes the wind direction such that the wind blows upward or downward (the direction of the arrow Y2 in FIG. 3) from the air outlet 51.

The blower base 53 supports the blower body 52 at a predetermined height. This blower base 53 is configured such that the air outlet 51 is disposed higher than pages P at the destination position. Therefore a wind which blows from the air outlet 51 passes above pages P at the departure position and blows against pages P at the destination position. Pages P at the departure position is not much affected by the wind, while pages P at the destination position is much affected by the wind.

Next, the main control configuration of a document camera system 1 according to the embodiment will be explained. FIG. 13 is a block diagram showing the main control configuration of the document camera system 1. As shown in FIG. 13, the control unit 36 of the page-turning device 3 includes: a motor driver 361 which drives the first drive unit 33; a motor driver 362 which drives the second drive unit 37; a motor driver 368 which drives the fan unit 54; a motor driver 369 which drives the wind-direction adjustment unit 55; a ROM 363 where a variety of programs are stored; a RAM 364 where the programs stored in the ROM 363 are opened when the programs are executed; an operation unit 365 where a variety of instructions are inputted; a CPU 366 which controls the motor drivers 361 and 362 by opening and executing the programs, which are stored in the ROM 363, in the RAM 364 on the basis of the instructions from the operation unit 365; an I/F 367 to which the computer 4 is connected; and a power source 370.

The operation unit 365 includes a start switch 365*a* for starting page-turning processing and a stop switch 365*b* for stopping the page-turning processing. The CPU 366 counts turned pages as a value N from the time when the start switch 365*a* is operated to the time when the stop switch 365*b* is operated. The value N is stored in the RAM 364.

An image-reading method by the document camera system 1 will be explained hereinafter.

Figure 14:
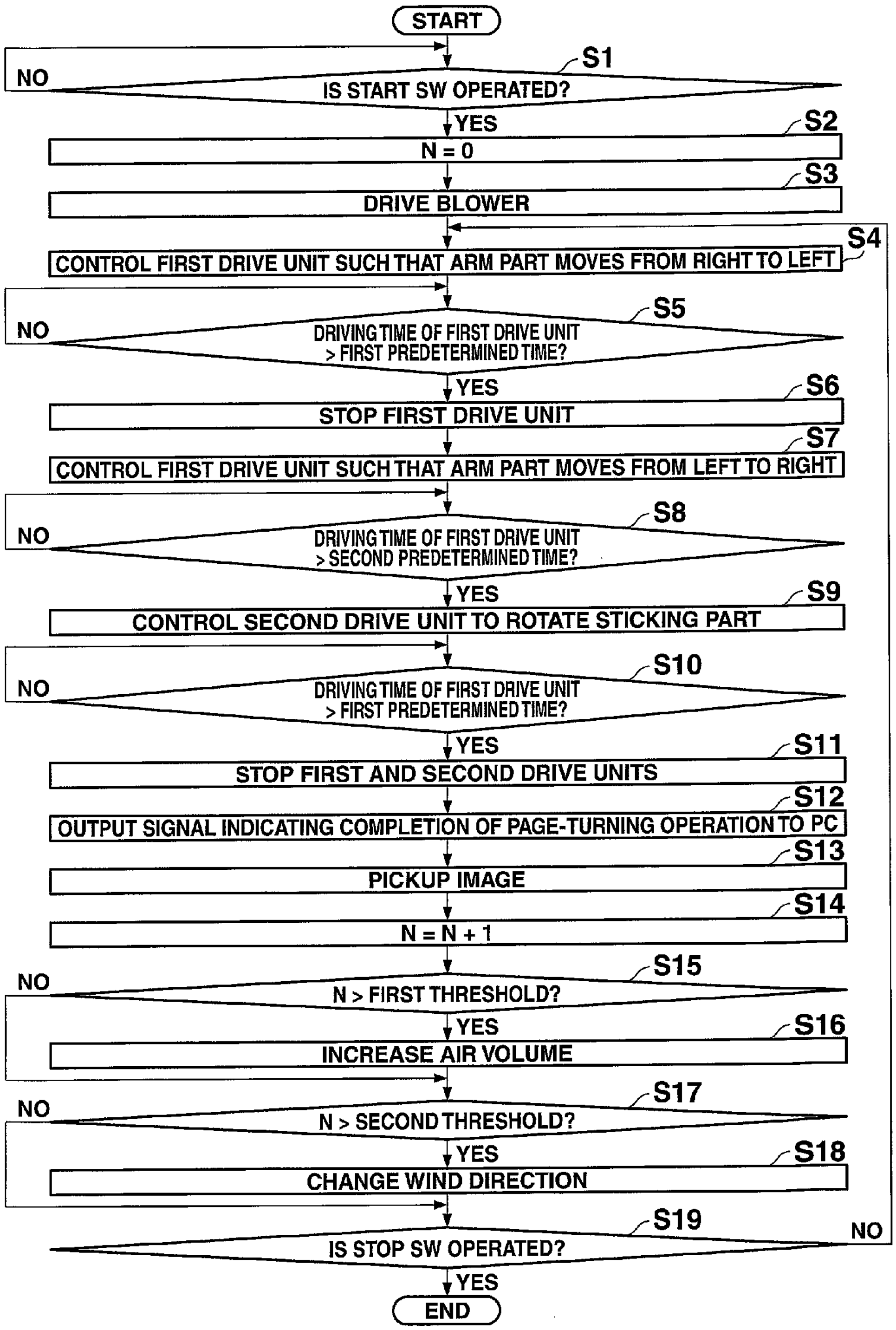
FIG. 14 is a flowchart of page-turning processing by the page-turning device of the embodiment.

FIG. 14 is a flowchart of the page-turning processing.

First, preparation before execution of the page-turning processing will be explained.

In the page-turning device 3, the position of the arm part 34 is adjusted such that the sticking part 35 is disposed at the starting point (the end point of the homeward movement) in advance. At the time, a user checks the adhesive power of the adhesive component 352. If the adhesive power is weak, the user removes the weak portion to expose a new portion of the adhesive component 352. Then, the user opens the book B such that one page (one double-page spread) P before a page (a double-page spread) P from which the user would like to start image pickup is exposed and moves the sticking part 35 to the end point of the outward movement (the start point of the homeward movement). When the power source of the page-turning device 3 is turned on, the CPU 366 opens in the RAM 364 a program for the page-turning processing stored in the ROM 363 to execute the program.

As shown in FIG. 14, at Step S1, the CPU 366 determines whether or not the start switch 365*a* is operated. When determining that the start switch 365*a* is not operated, the CPU 366 keeps the state as it is. When determining that the start switch 365*a* is operated, the CPU 366 shifts the processing to Step S2.

At Step S2, the CPU 366 resets the value N, which is stored in the RAM 364, at zero.

At Step S3, the CPU 366 drives the fan unit 54 to carry out blowing with the blower 5. At this time, an air volume of the fan unit 54 is set at an initial air volume. In the beginning of turning pages P, a large number of pages P exist at the departure position, so the thickness of pages P as a whole is large. Therefore the wind-direction adjustment unit is controlled such that a wind from the blower 5 blows in a direction slightly upward from a horizontal plane.

At Step S4, the CPU 366 controls the first drive unit 33 such that the arm part 34 moves from right to left (homeward movement).

At Step S5, the CPU 366 determines whether or not a driving time of the first drive unit 33 exceeds a first predetermined time. When determining that the driving time does not exceed the first predetermined time, the CPU 366 keeps driving the first drive unit 33. When determining that the driving time exceeds the first predetermined time, the CPU 366 shifts the processing to Step S6. The first predetermined time is set at a time length enough for the arm part 34 to move from the start point to the end point of the homeward movement.

At Step S6, the CPU 366 stops the first drive unit 33. Thereby, the sticking part 35 sticks to a page P on the left with rotation of the sticking part 35 stopped.

At Step S7, the CPU 366 controls the first drive unit 33 such that the arm part 34 moves from left to right (outward movement).

At Step S8, the CPU 366 determines whether or not a driving time of the first drive unit 33 exceeds a second predetermined time. When determining that the driving time does not exceed the second predetermined time, the CPU 366 keeps driving the first drive unit 33. When determining that the driving time exceeds the second predetermined time, the CPU shifts the processing to Step S9. The second predetermined time is set at a time (time length) shorter than the first predetermined time. In particular, it is preferable that the second predetermined time period is set from a time for the arm part 34 to move from the start point to around the middle point of the outward movement to a time for the arm part 34 to move from the start point to almost the end point of the outward movement.

Figure 15:
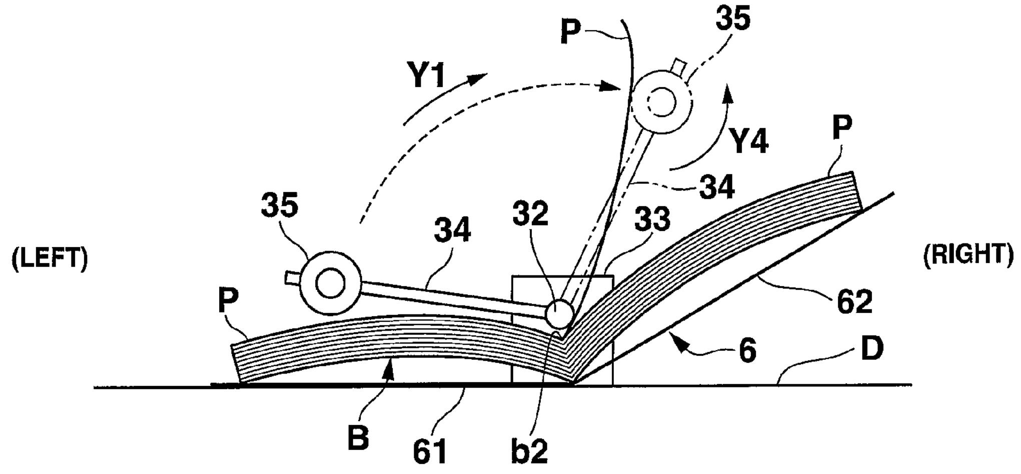
FIG. 15 is an elevation view showing a route and a rotating direction of the sticking part in an outward movement of the arm part according to the embodiment.

At Step S9, the CPU 366 controls the second drive unit 37 to rotate the sticking part 35 while keeping driving the first drive unit 33. This rotation changes the adhesive power of the sticking part 35 when the sticking part 35 separates from a page P, so that the sticking part 35 can reliably separate from the page P. As shown in FIG. 15, the arm part 34 rotates clockwise (arrow Y1) in the outward movement. In order to improve the separation performance, it is preferable that the second drive unit 37 rotate the sticking part 35 in a direction opposite to the swing direction of the arm part 34, i.e. counterclockwise.

At Step S10, the CPU 366 determines whether or not the driving time of the first drive unit 33 exceeds the first predetermined time. When determining that the driving time does not exceed the first predetermined time, the CPU 366 keeps driving the first drive unit 33 and the second drive unit 37. When determining that the driving time exceeds the first predetermined time, the CPU 366 shifts the processing to Step S11.

At Step S11, the CPU 366 stops the first drive unit 33 and the second drive unit 37. The sticking page P is separated from the sticking part 35 while the second drive unit 37 rotates. Thereby, the sticking part 35 is located at a position apart from pages P of the destination position with no page P sticking thereto. The sticking part 35 and the arm part 34 at this position are outside the angle of view of the camera 22. Thus the whole turning unit 30 is outside the angle of view of the camera 22. (See FIG. 2A.)

Figure 16:
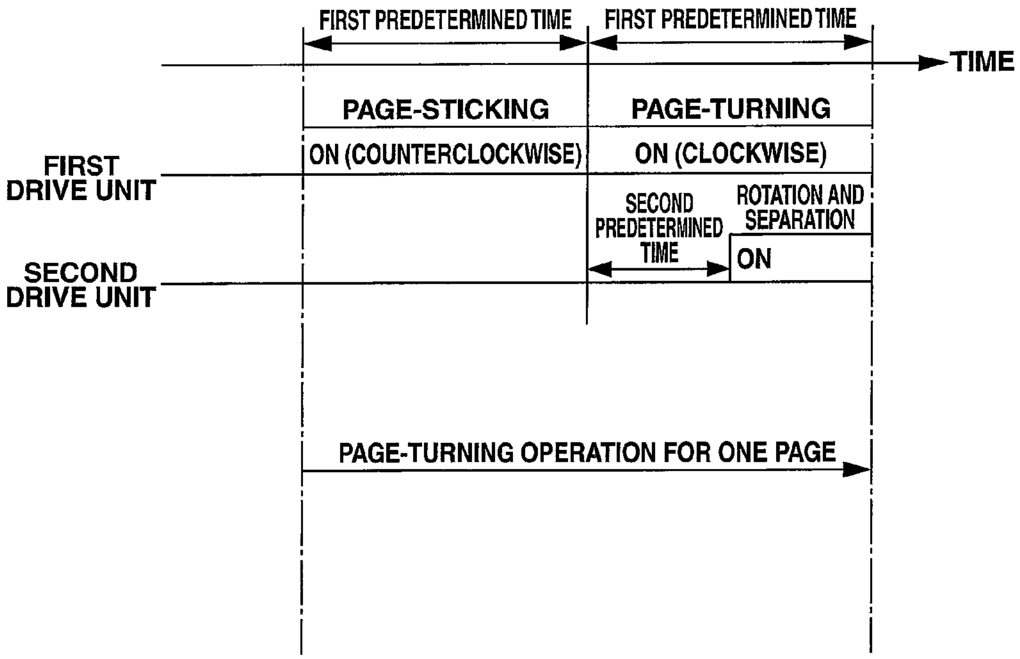
FIG. 16 is a timing chart showing drive timings of the first drive unit and the second drive unit in the page-turning operation for one page according to the embodiment.

FIG. 16 illustrates drive timings of the first drive unit 33 and the second drive unit 37 in the page-turning operation for one page.

In the embodiment, a drive end timing when the second drive unit 37 stops coincides with a drive end timing when the first drive unit 33 stops. However, the drive end timing when the second drive unit 37 stops may be earlier than the drive end timing when the first drive unit 33 stops.

At Step S12, the CPU 366 outputs a signal which indicates completion of the page-turning processing to the computer 4.

At Step S13, the computer 4 controls the camera 22 on the basis of the inputted signal which indicates completion of the page-turning operation so that the pages P opened at present (spread state) are imaged (image pickup). At the time, since the turning unit 30 and the blower 5 are outside the angle of view of the camera 22, only the pages P opened at present are imaged. Picked-up image data generated by the camera 22 are numbered one by one (each imaging) and stored in a storage unit 41 of the computer 4.

In a preferred embodiment, Step S13 may involve capturing images on only odd-numbered flat pages P at the departure position, placing even-numbered pages P at the departure position, capturing images on even-numbered pages P, and collating all the pages P in numerical order into one scanned image, instead of capturing opened two pages P at once.

At Step S14, the CPU 366 adds one to the value N and stores the result in the RAM 364.

At Step S15, the CPU 366 determines whether or not the value N exceeds a first threshold. When determining that the value N exceeds the first threshold, the CPU 366 shifts the processing to Step S16. When determining that the value N does not exceed the first threshold, the CPU 366 shifts the processing to Step S17. When many pages P are piled up at the destination position, the pages P are likely to return to the departure position. Therefore the first threshold is set at such an amount of turned pages that a wind of the initial air volume can reliably push pages P against the destination position.

At Step S16, the CPU 366 controls the fan unit 54 to make the air volume larger than the initial air volume.

At Step S17, the CPU 366 determines whether or not the value N exceeds a second threshold. When determining that the value N exceeds the second threshold, the CPU 366 shifts the processing to Step S18. When determining that the value N does not exceed the second threshold, the CPU 366 shifts the processing to Step S19. As many pages P are turned, the height of the pages P at the departure position as a whole gets lower, and the lower edge of the last turned page P at the destination position gets lower. Therefore the second threshold is set at such an amount of turned pages that a wind in the initial wind direction can reliably push pages P against the destination position.

At Step S18, the CPU 366 controls the wind-direction adjustment unit 55 to make the wind direction downward as compared with the initial wind direction.

At Step S19, the CPU 366 determines whether or not the stop switch **365*b* is operated. When determining that the stop switch 365*b* is not operated, the CPU 366 shifts the processing to Step S2. When determining that the stop switch 365*b* is operated, the CPU 366** ends the page-turning processing. In this way, the page-turning operation and the image pickup operation are alternately carried out, and image pickup of designated pages P is completed.

As described above, according to the embodiment, since the effective surface of the sticking part 35 obliquely comes into contact with the page P at the departure position, the area of the contact between the sticking part 35 and the page P at the initial stage of the contact can be small. This can apply a high pressure on the page P at the initial stage of the contact of the sticking part 35 with the page P, ensuring the sticking of the sticking part 35 to the page P. The page-turning device according to the embodiment of the present invention can thereby have improved performance in holding (adhesion) of (to) a page to be turned, and enhanced reliability of the page-turning.

Furthermore, after the sticking part 35 comes into contact with the page P at the departure position, the effective surface of the sticking part 35 comes into close contact with the page P in a larger contact area. Thus the contact area of the sticking part 35 which sticks to the page P at the initial stage of the contact is expanded, which allows the sticking part 35 to stick to the page P more effectively.

Since the arm part 34 has a flat planar cross-section cut along a plane perpendicular to the longitudinal direction thereof, the arm part 34 can be readily twisted. Such a twist of the arm part 34 allows for a simple configuration to expand the area of the contact between the sticking part 35 and the page P.

Since the arm part 34 is twisted around its axis in the longitudinal direction after the sticking part 35 comes into contact with the page P at the departure position, the force required for the twist of the arm part 34 is less than the force required for the twist around the axis of the arm part 34 in the width direction.

Since one circumferential end portion of the substantially columnar sticking part (adhesive part) 35 obliquely comes into contact with the page P, reduction of the contact area is achieved with a simple configuration.

Since a generating line (or a band including the generating line) of the substantially-columnar sticking part 35 comes into close contact with the page P after the sticking part 35 comes into contact with the page P at the departure position, a corner portion of the sticking part 35 does not come into contact with the page P even after the contact area become larger. This prevents the page P from being damaged.

Since the rotating roller 351 is made of an elastic body, the rotating roller 351 can absorb shock caused by the contact of the sticking part 35 with page P. This prevents the page P from being damaged.

Since the arm part 34 is made of resin, the arm part 34 can easily have an appropriate elasticity suitable for desired twisting characteristics.

Since the sticking force of the sticking part 35 is changed in conjunction with the rotation of the sticking part 35 upon the release of the page P from the sticking part 35, the sticking force can be weaken by the rotation of the sticking part 35. This ensures the release of the page P from the sticking part 35.

Since the document camera system 1 including the camera 22 which captures images of the pages P of the book B is provided with the page-turning device 3, the document camera system 1 securely captures the images of the pages P during an automatic page-turning of the pages P.

It should be understood that any alteration other than the embodiments described above can be applied to the present invention.

Figure 17:
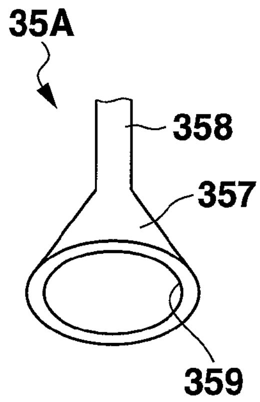
FIG. 17 is a perspective view of a sticking part according to a modification of the embodiment, illustrating an outline structure of the sticking part to suck a page.

The exemplary sticking part 35 described above includes the adhesive component 352 and sticks to the page P by the adhesion of the adhesive component 352. Alternatively, the sticking part 35 may stick to the page P by suction force using a negative pressure caused by suction of air, for example. FIG. 17 is a perspective view of a sticking part 35A, illustrating an outline configuration of a sticking part 35A to suck the page P. As illustrated in FIG. 17, the sticking part 35A has a main body 357 which has a substantially triangular-pyramid shape, and an air pipe 358 which extends from the upper portion of the main body 357 and is in communication with a pump (not shown). The main body 357 is provided, on the bottom surface thereof, with a suction port 359 through which the negative pressure is applied to suck the page P. The suction port 359 is in communication with the pump via the air pipe 358. The pump is driven to evacuate the inner space of the main body 357 via the air pipe 358 so that a negative pressure is applied to the suction port 359 to suck the page P. Such suction force allows the sticking part 35A to stick to the page P. The sticking part 35A is attached to the top end of the arm part 34.

Figure 18:
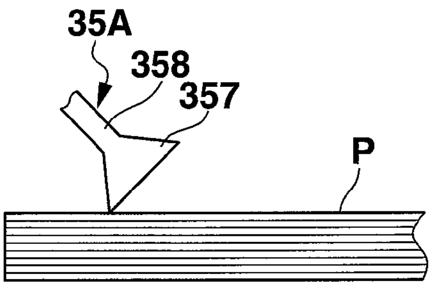
FIG. 18 is a schematic view of the sticking part of FIG. 17 at the initial state of the contact with a page at the departure position.

FIG. 18 is a schematic view of the sticking part 35A at the initial stage of the contact with the page P at the departure position. As illustrated in FIG. 18, an effective (bottom) surface of the sticking part 35A obliquely comes into contact with the page P at the departure position at an initial stage of contact. For the sticking part 35A obliquely coming into contact with the page P in such a manner, the suction port 59 is not entirely covered by the page P upon the contact with the page P, so that a negative pressure does not directly applied on the page P at the initial stage. In contrast, for a sticking part coming into contact with the page P such that the effective surface of the sticking part is parallel to the page P upon the contact with the page P, a negative pressure is applied on the contacting surface at once. This may cause undesirable distortion of the page P. The sticking part 35A, which does not directly apply the negative pressure on the page P upon the contact with the page P, prevents the distortion of the page P and can effectively come into contact with the page P in a stable and gentle manner.

Figure 19:
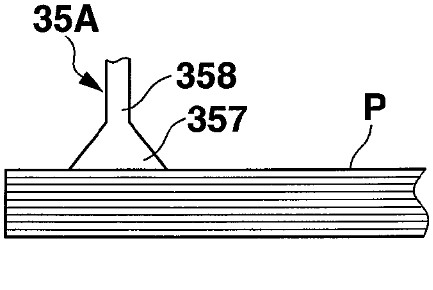
FIG. 19 is a schematic view of the sticking part of FIG. 18, the arm part of the sticking part having been moved from the position illustrated in FIG. 18.

FIG. 19 is a schematic view showing a state in which the arm part 34 has been moved from the position illustrated in FIG. 18. The arm part 34 of the sticking part 35A at the initial stage of the contact with the page P at the departure position is still moved by the first drive unit 33. Since the sticking part 35A remains in contact with the page P, the arm part 34 is twisted around its axis, which is parallel to the longitudinal direction of the arm part 34. This allows the entire effective surface of the sticking part 35A to come into close contact with the page P. The sticking part 35A in such a state begins to apply the negative pressure directly on the page P, thereby can effectively come into contact with the page P in a stable and gentle manner to stick to the page P.

As described above, even when suction force is used to stick to the page P, the two-step sticking operation is applied to the sticking part 35A. Therefore the sticking part 35A can effectively stick to the page P utilizing configuration of the present invention appropriately.

The sticking part may stick to the page P by electrostatic sticking or adhesion instead of suction or adhesion.

The sticking (adhesion, suction) to the page and the release of the page are opposite operations; thus an increase in sticking (adhesive, suction) force may cause problems with the releasing operation of a page. According to the present invention, the two-step sticking operation of the sticking part upon the sticking (adhesion) to the page can increase reliability of the sticking (adhering, suction) operation of the sticking part without changing sticking (adhesive or suction) force, and can ensure the sticking (adhering, suction) operation of the sticking part to the page and the releasing operation of the page that are opposite to each other.

Though several embodiments of the present invention are illustrated, the scope of the invention is not limited to the above embodiments but includes the scope of claims attached below and the scope of their equivalents.

What is claimed is:

1. A page-turning device for turning a page of a book comprising:

an adhesive part which adheres to the page of the book, which is opened;

an arm part with the adhesive part provided on a top end, the arm part being configured to swing such that the adhesive part adheres to the page at a departure position of the page and separates from the page at a destination position of the page while the adhesive part goes to and fro between the departure position and the destination position over the book; and a first drive unit which swings the arm part around a drive shaft of the first drive unit, wherein the adhesive part has a substantially-columnar shape, wherein the adhesive part obliquely comes into contact with the page at one circumferential end portion of the substantially-columnar adhesive part at the departure position at an initial stage of the contact, and wherein after the adhesive part comes into contact with the page at the departure position, the adhesive part comes into close contact with the page at a generating line of the substantially-columnar adhesive part.

2. The page-turning device according to claim 1, wherein, after the adhesive part comes into contact with the page at the departure position, the arm part is moved by the first drive unit such that the effective surface of the adhesive part comes into close contact with the page in a larger contact area than an area of the contact between the adhesive part and the page at the initial stage of the contact.

3. The page-turning device according to claim 1, wherein the arm part has a flat planar cross-section cut along a plane perpendicular to a longitudinal direction of the arm part.

4. The page-turning device according to claim 1, wherein, after the adhesive part comes into contact with the page at the departure position, the arm part is twisted around its axis parallel to a longitudinal direction of the arm part such that the adhesive part comes into close contact with the page.

5. The page-turning device according to claim 1, wherein the adhesive part comprises:

an adhesive component which adheres to the page; and a rotating roller around which the adhesive component is removably disposed, wherein the rotating roller is made of an elastic body.

6. The page-turning device according to claim 1, wherein the arm part is made of resin.

7. The page-turning device according to claim 1, further comprising:

a second drive unit to rotate the adhesive part relative to the arm part, wherein the second drive unit rotates the adhesive part such that adhesive force of the adhesive part is changed to release the page from the adhesive part.

8. A document camera system comprising:

the page-turning device according to claim 1; and an imaging unit which images pages of the book.

9. A page-turning device for turning a page of an open book comprising:

a page-turning mechanism including an adhesive part, the page-turning mechanism holding the page at a departure position of the page with the adhesive part and releasing the page at a destination position of the page, wherein the adhesive part has a substantially-columnar shape, wherein the adhesive part obliquely comes into contact with the page at one circumferential end portion of the adhesive part at the departure position at an initial stage of the contact, and wherein after the adhesive part comes into contact with the page at the departure position, the adhesive part comes into close contact with the page at a generating line of the adhesive part.

* * * * *